United States Patent
Leamy et al.

(10) Patent No.: US 10,808,618 B2
(45) Date of Patent: Oct. 20, 2020

(54) JET ENGINE COLD AIR COOLING SYSTEM

(71) Applicant: General Electric Company, Schenectady, NY (US)

(72) Inventors: Kevin Richard Leamy, Loveland, OH (US); Benjamin Paul Breig, Liberty Township, OH (US); Michael Jay Epstein, Mason, OH (US); Javier Armando Parrilla, Fairfield, OH (US); Matthew John Hurt, Liberty Township, OH (US); Thomas Edward Brinson, Mason, OH (US); Andrew James Fleming, Franklin, OH (US); George Eugene Wilmot, Jr., East Granby, CT (US)

(73) Assignee: General Electric Company, Schenectady, NY (US)

( * ) Notice: Subject to any disclaimer, the term of this patent is extended or adjusted under 35 U.S.C. 154(b) by 648 days.

(21) Appl. No.: 15/322,844

(22) PCT Filed: Jun. 30, 2015

(86) PCT No.: PCT/US2015/038528
§ 371 (c)(1),
(2) Date: Dec. 29, 2016

(87) PCT Pub. No.: WO2016/004023
PCT Pub. Date: Jan. 7, 2016

(65) Prior Publication Data
US 2018/0194480 A1    Jul. 12, 2018

Related U.S. Application Data

(60) Provisional application No. 62/022,364, filed on Jul. 9, 2014, provisional application No. 62/020,512, filed on Jul. 3, 2014.

(51) Int. Cl.
F02C 7/18 (2006.01)
B64D 13/00 (2006.01)
(Continued)

(52) U.S. Cl.
CPC ............ F02C 7/185 (2013.01); B64D 13/006 (2013.01); B64D 13/06 (2013.01); B64D 13/08 (2013.01);
(Continued)

(58) Field of Classification Search
None
See application file for complete search history.

(56) References Cited

U.S. PATENT DOCUMENTS 2,966,036 A   12/1960 Stowens
3,097,508 A   7/1963 Leech et al.
(Continued)

FOREIGN PATENT DOCUMENTS

CN   101010238 A   8/2007
CN   101291848 A   10/2008
(Continued)

OTHER PUBLICATIONS

PCT Search Report and Written Opinion issued in connection with corresponding PCT Application No. PCT/US2015/038528 dated Sep. 28, 2015.
(Continued)

*Primary Examiner* — Steven M Sutherland
*Assistant Examiner* — Rodolphe Andre Chabreyrie
(74) *Attorney, Agent, or Firm* — Dority & Manning, P.A.

(57) ABSTRACT

Methods and devices for cooling systems (100, 700) are provided that are in fluid communication with bleed air from a jet engine compressor. The cooling systems include: a first precooler (210) receiving bleed air from the jet engine compressor; a heat exchanger (730) downstream from the
(Continued)

first precooler (210); a cooling system compressor (220) downstream from the first precooler (210), wherein the heat exchanger (730) and the cooling system compressor (220) are in separate flow paths from the first precooler (210); a cooling system precooler (230) downstream from the cooling system compressor (220); a cooling system turbine (240) with variable guide vanes—VGT—and downstream from the cooling system precooler (230); and a discharge conduit (245) downstream from the cooling system turbine (240) and the heat exchanger (730). A bypass line (290) can also be included that bypasses the cooling system turbine (240).

21 Claims, 9 Drawing Sheets

(51) Int. Cl.
| | | |
|---|---|---|
| *B64D 13/06* | (2006.01) | |
| *F01D 13/02* | (2006.01) | |
| *F02C 6/08* | (2006.01) | |
| *B64D 13/08* | (2006.01) | |
| *F01D 17/08* | (2006.01) | |
| *F01D 17/10* | (2006.01) | |
| *F01D 25/12* | (2006.01) | |
| *F02C 9/18* | (2006.01) | |
| *F02C 7/32* | (2006.01) | |
| *F01D 17/14* | (2006.01) | |

(52) U.S. Cl.
CPC ............. *F01D 13/02* (2013.01); *F01D 17/08* (2013.01); *F01D 17/10* (2013.01); *F01D 17/14* (2013.01); *F01D 25/12* (2013.01); *F02C 6/08* (2013.01); *F02C 7/32* (2013.01); *F02C 9/18* (2013.01); *B64D 2013/0618* (2013.01); *B64D 2013/0648* (2013.01); *B64D 2013/0688* (2013.01); *F05D 2220/323* (2013.01); *F05D 2220/3216* (2013.01); *F05D 2260/211* (2013.01); *F05D 2260/213* (2013.01); *F05D 2260/232* (2013.01); *F05D 2260/606* (2013.01); *F05D 2270/301* (2013.01); *F05D 2270/303* (2013.01); *Y02T 50/56* (2013.01); *Y02T 50/675* (2013.01); *Y02T 50/676* (2013.01)

(56) References Cited

U.S. PATENT DOCUMENTS

| | | | | |
|---|---|---|---|---|
| 4,127,011 A * | 11/1978 | Giles | ............... | B64D 13/06 62/402 |
| 4,261,416 A * | 4/1981 | Hamamoto | ........... | B64D 13/06 165/271 |
| 4,523,517 A | 6/1985 | Cronin | | |
| 5,086,625 A | 2/1992 | Momose et al. | | |
| 5,125,597 A | 6/1992 | Coffinberry | | |
| 5,136,837 A | 8/1992 | Coffinberry | | |
| 5,137,230 A * | 8/1992 | Coffinberry | ........... | B64C 21/06 244/118.5 |
| 5,141,182 A | 8/1992 | Coffinberry | | |
| 5,143,329 A | 9/1992 | Coffinberry | | |
| 5,373,707 A | 12/1994 | Ostersetzer | | |
| 5,442,905 A | 8/1995 | Claeys et al. | | |
| 6,199,387 B1 * | 3/2001 | Sauterleute | ............ | B64D 13/06 62/87 |
| 6,250,097 B1 * | 6/2001 | Lui | ............... | B64D 13/06 62/402 |
| 6,295,822 B1 * | 10/2001 | Mueller | ............... | B64D 13/06 62/172 |
| 6,305,156 B1 * | 10/2001 | Lui | ............... | B64D 13/06 454/76 |
| 6,415,595 B1 * | 7/2002 | Wilmot, Jr. | ........... | B64D 13/006 60/266 |
| 6,427,471 B1 | 8/2002 | Ando et al. | | |
| 7,171,819 B2 * | 2/2007 | Lui | ............... | B64D 13/06 454/71 |
| 7,618,008 B2 | 11/2009 | Scherer et al. | | |
| 7,624,592 B2 | 12/2009 | Lui et al. | | |
| 8,484,983 B2 | 7/2013 | Gao et al. | | |
| 8,516,826 B2 | 8/2013 | Rostek et al. | | |
| 2002/0035838 A1 | 3/2002 | Sauterleute et al. | | |
| 2004/0195447 A1 * | 10/2004 | Claeys | ............ | B64D 13/06 244/118.5 |
| 2006/0196216 A1 * | 9/2006 | Bruno | ............ | B64D 13/06 62/402 |
| 2012/0297789 A1 * | 11/2012 | Coffinberry | ............. | F01D 25/08 60/785 |
| 2013/0086927 A1 | 4/2013 | Mills | | |
| 2015/0059397 A1 * | 3/2015 | Bruno | ............ | B64D 13/06 62/402 |
| 2015/0307183 A1 * | 10/2015 | Bruno | ............ | B64D 13/06 244/209 |

FOREIGN PATENT DOCUMENTS

| | | |
|---|---|---|
| CN | 102648127 A | 8/2012 |
| EP | 0544474 A | 6/1993 |
| EP | 1129941 | 9/2001 |
| GB | 859668 A | 1/1961 |
| GB | 859668 A | 1/1961 |
| GB | 2076897 A | 12/1981 |
| JP | S5758598 A | 4/1982 |
| JP | H05238489 | 9/1993 |
| JP | 2001/071999 A | 3/2001 |
| JP | 2002/002596 A | 1/2002 |
| WO | WO2002/016743 A | 2/2002 |

OTHER PUBLICATIONS

PCT Search Report and Written Opinion issued in connection with Related PCT Application No. PCT/US2015/038524 dated Oct. 2, 2015.

Canadian Office Action Corresponding to Application No. 2953533 dated Nov. 27, 2017.

Canadian Office Action Corresponding with Application No. 2953533 dated Aug. 20, 2018.

Chinese Office Action Corresponding to Application No. 201580036383.0 dated Jan. 25, 2018.

Chinese Office Action Corresponding to Application No. 201580036391.5 dated Aug. 2, 2018.

Chinese Office Action Corresponding to Application No. 201580036383.0 dated Aug. 3, 2018.

Chinese Office Action Corresponding to Application No. 201580036383.0 dated Dec. 3, 2018.

Chinese Office Action Corresponding to Application No. 201580036383.0 dated Dec. 12, 2018.

European Office Action Corresponding to Application No. 15736768.1 dated Aug. 10, 2018.

European Office Action Corresponding to Application No. 15738213.6 dated Aug. 10, 2018.

Japanese Office Action Corresponding to Application No. 2016574268 dated Apr. 23, 2019.

Japanese Office Action Corresponding to Application No. 2016575211 dated Apr. 23, 2019.

* cited by examiner

JET ENGINE COLD AIR COOLING SYSTEM

PRIORITY INFORMATION

The present application is a national stage application under 35 U.S.C. § 371(c) of prior filed PCT application serial number PCT/US15/38528, filed on Jun. 30, 2015, which claims priority to U.S. Provisional Patent Application Ser. No. 62/020,512 titled "Jet Engine Cold Air Cooling System" of Leamy, et al. filed on Jul. 3, 2014, and to U.S. Provisional Patent Application Ser. No. 62/022,364 titled "Jet Engine Cold Air Cooling System" of Leamy, et al. filed on Jul. 9, 2014. The disclosures of the above-listed applications are incorporated by reference herein.

FIELD OF THE INVENTION

The present disclosure is directed to jet engines and, more specifically, to utilization of jet engine bleed air for cooling thermal loads associated with the engine or vehicle to which the engine is coupled.

BACKGROUND OF THE INVENTION

Modern day jet airplanes direct regulated airflow from the jet engine to the occupied cabins and other areas of the aircraft. This airflow, commonly referred to as bleed air, may be withdrawn from the high pressure compressor (HPC) section of a jet engine. U.S. Pat. Nos. 5,137,230 and 5,125,597 describe conventional structures and methods utilized to direct bleed air into environmental control systems (ECS) of the aircraft that further process the bleed air prior to cabin introduction. ECS incorporate various pieces of equipment such as air cycle machines (ACMs), regulating valves, heat exchangers, and other apparatus to condition engine bleed air prior to cabin introduction.

Bleed air is commonly extracted from multiple locations along the HPC section using regulated flow to control the extent to which bleed air is withdrawn. Among the regulating structures are check valves that operate to allow or discontinue airflow and downstream regulator valves that reduce the pressure of the withdrawn bleed air before it reaches the ECS. This reduced pressure bleed air may be directed to a turbine, where work is extracted, with the bleed air outlet pressure and temperature from the turbine being significantly reduced. This reduced pressure bleed air remains relatively hot and is thereafter cooled by fan air in a heat exchanger associated with the jet engine conventionally referred to as a precooler. Cooled bleed air output from the precooler is delivered to the ECS where it may be further cooled and pressures further regulated prior to introduction to the occupied cabins or other areas of the aircraft. In addition to supplying bleed air to the ECS, the jet engine provides a heat sink that provides precooled air to the aircraft and receives high temperature air from the aircraft in return as part of a cycle.

Regardless of the structures or methods utilized, one constant has remained with respect to the bleed air supplied to the ECS: it could be no lower in temperature than the lowest temperature air flowing through the jet engine. Moreover, the bleed air has always been regulated from the HPC using flow control valves that restrict airflow and are operative to step down the bleed air pressure prior to reaching the precooler. Consequently, there is a need in the art for structures and methods of delivering bleed air to an ECS at temperatures lower than the lowest temperature air otherwise flowing through the jet engine.

BRIEF DESCRIPTION OF THE INVENTION

Aspects and advantages of the invention will be set forth in part in the following description, or may be obvious from the description, or may be learned through practice of the invention.

Cooling systems are generally provided that are in fluid communication with bleed air from a jet engine compressor.

In one embodiment, the cooling system includes: a first precooler in fluid communication with the bleed air from the jet engine compressor; a heat exchanger in fluid communication with and downstream from the first precooler; a cooling system compressor in fluid communication with and downstream from the first precooler, wherein the heat exchanger and the cooling system compressor are in separate flow paths from the first precooler; a cooling system precooler in fluid communication with and downstream from the cooling system compressor; a cooling system turbine in fluid communication with and downstream from the cooling system precooler; and a discharge conduit downstream from the cooling system turbine and the heat exchanger.

In another embodiment, the cooling system includes: a first precooler in fluid communication with the bleed air from the jet engine compressor; a cooling system compressor in fluid communication with and downstream from the first precooler; a cooling system precooler in fluid communication with and downstream from the cooling system compressor; a cooling system turbine in fluid communication with and downstream from the cooling system precooler; a discharge conduit downstream from the cooling system turbine; and a bypass line in fluid communication with and downstream from the cooling system precooler. The bypass line is in fluid communication with and upstream from the discharge conduit, and provides selective fluid communication between an inlet side and a discharge side of the cooling system turbine to bypass the cooling system turbine.

Jet engines are also provided that include: an engine compressor; a combustor in flow communication with the engine compressor; an engine turbine in flow communication with the combustor to receive combustion products from the combustor; and a cooling system as described above in fluid communication with bleed air from the engine compressor. Airplanes that include such a jet engine and at least one of an aircraft thermal management system and an aircraft environmental control system, wherein the discharge conduit is in fluid communication with the at least one of the aircraft thermal management system and the aircraft environmental control system.

Methods are also generally provided for cooling bleed air in a jet engine. In one embodiment, the method includes: extracting bleed air from a jet engine compressor; directing the bleed air to a first precooler, wherein the bleed air has an extracted temperature; reducing the extracted temperature of the bleed air to a second temperature in the first precooler; thereafter, directing a first portion of the bleed air to a heat exchanger and directing a second portion of the bleed air to a cooling system compressor such that the first portion and the second portion define separate flow paths; flowing the first portion of the bleed air through a heat exchanger to reduce the second temperature of the first portion to a third temperature; flowing the second portion of the bleed air sequentially through a cooling system compressor, a cooling system precooler, and a cooling system turbine to reduce the second temperature of the second portion to a fourth temperature, wherein the fourth temperature is less than the extracted temperature; and thereafter, mixing the first portion and the second portion in a discharge conduit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
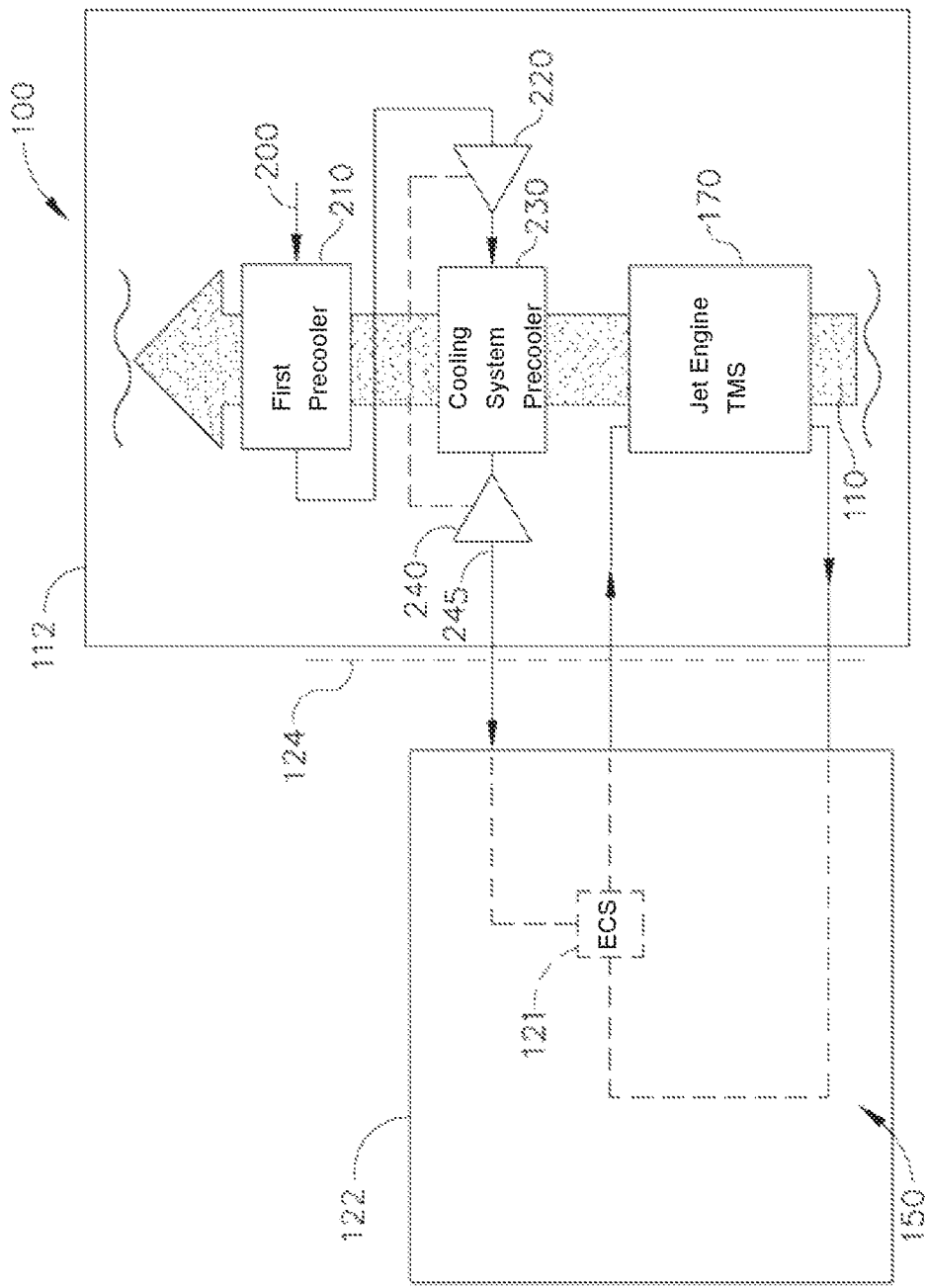
FIG. 1 is a schematic diagram of an exemplary embodiment of a cold air cooling system, shown by way of example as part of an airplane.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components. Also, the terms "upstream" and "downstream" refer to the relative direction with respect to fluid flow in a fluid pathway. For example, "upstream" refers to the direction from which the fluid flows, and "downstream" refers to the direction to which the fluid flows.

A bleed air cooling system is generally provided that is in fluid communication with bleed air from a compressor within a jet engine. The bleed air cooling system is generally configured to cool the received bleed air and provide the cooled air (e.g., via a discharge conduit from the bleed air cooling system) to at least one of an aircraft thermal management system and an aircraft environmental control system. The cooled air output from the cooling system has, in one embodiment, a temperature that is less than the mean flow path temperature of air coming into and through the engine. Methods of providing cooled fluid (e.g., cooled air) are also generally provided, with the input air being extracted from the jet engine (e.g., bleed air from the engine compressor).

Referencing FIGS. 1 and 6, a first exemplary cold air cooling system 100 is configured to supply unregulated bleed air from a high pressure compressor (HPC) of a jet engine 112 to an aircraft thermal management system and/or an environmental control system (ECS) 121 of an aircraft 122 at a temperature that is below the engine air stream 110. For purposes of the instant disclosure, an engine cooling stream includes, without limitation, one or more of the following: fan stream air, inlet air drawn into the intake, and ram air. Pursuant to the following exemplary explanation, the system 100 of the jet engine 112 will be described as being in fluid communication with structures associated with the aircraft 122.

Figure 6:
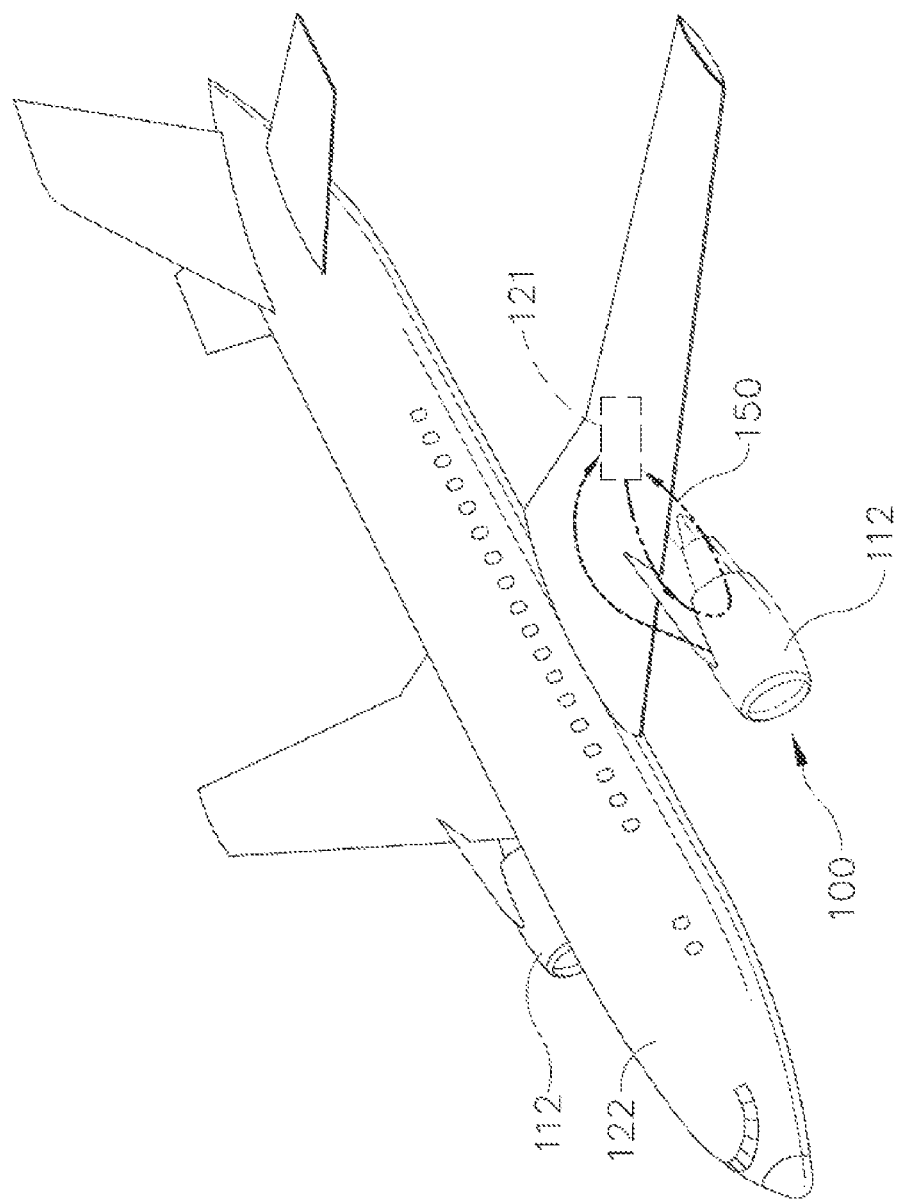
FIG. 6 is an elevated perspective view of an airplane incorporating a cold air cooling system in accordance with the instant disclosure.

Referencing FIGS. 1 and 6, a conventional thermal management system (TMS) loop 150 is utilized to draw thermal energy away from the aircraft 122 and deliver/pump this thermal energy to the jet engine TMS 170. In order to better differentiate those structures associated with aircraft 122 from structures of the engine 112, a dotted line 124 is depicted. Consequently, structures to the right of the dotted line 124 are depicted and described in exemplary form as part of the engine 112, whereas those structures to the left of the dotted line 124 are depicted and described in exemplary form as separate from the engine 112 and are associated with the aircraft 122. It should be understood, however, that certain of the components associated with the aircraft 122 could instead be part of the engine 112, and vice versa. Accordingly, those skilled in the art should understand that the structures and description are exemplary in nature and the identification of structures as being part of the engine 112 or part of the aircraft 122 is not limiting.

Referring to FIG. 1, an exemplary cold air cooling system 100 is shown and includes a bleed air inlet feed 200 that is unregulated from the HPC section of the engine 112. This bleed air inlet feed 200 supplies high pressure and high temperature compressed air to a first precooler 210. In exemplary form, this first precooler 210 facilitates the transfer of thermal energy from the high pressure and high temperature bleed air to cooler air that is drawn into the engine 112. The bleed air output from the precooler 210 may have a significantly reduced temperature, but its pressure is not significantly changed. This lower temperature, high pressure air is fed into a cooling system compressor 220, which increases the temperature and pressure of the air. Consequently, the air output from the compressor 220 is significantly more pressurized and higher in temperature than the air input to the compressor. This very high pressure, high temperature air output from the compressor is directed to a cooling system precooler 230. By way of example, the cooling system precooler 230 facilitates the transfer of thermal energy from the very high pressure and high temperature bleed air to flow path temperature air that is drawn into the engine 112. The bleed air output from the cooling system precooler 230 has a significantly reduced temperature, but its very high pressure will not be significantly changed. This very high pressure, lower temperature bleed air output from the cooling system precooler 230 is directed into a cooling system turbine 240 having a variable area turbine nozzle (VATN). It should be noted, however, that a multiple position turbine nozzle or a fixed area turbine nozzle may be used in lieu of the variable area turbine nozzle. Work performed by the very high pressure bleed air turning the turbine 240 is utilized to power the compressor 220, with the output bleed air having a significantly reduced pressure and temperature. Those skilled in the art will understand that the turbine 240 may be mechanically or fluidically linked to the compressor 220 to transfer the work resulting from the very high pressure air expanding through the turbine.

In exemplary form, the temperature of the bleed air output from the turbine 240 into the discharge conduit 245 is lower than the mean flow path temperature of air coming into the engine 112. This is in stark contrast to prior art bleed air cooling systems that were unable to deliver bleed air to the aircraft 122 at a temperature below that of the mean flow path temperature of air coming into the engine 112.

Figure 2:
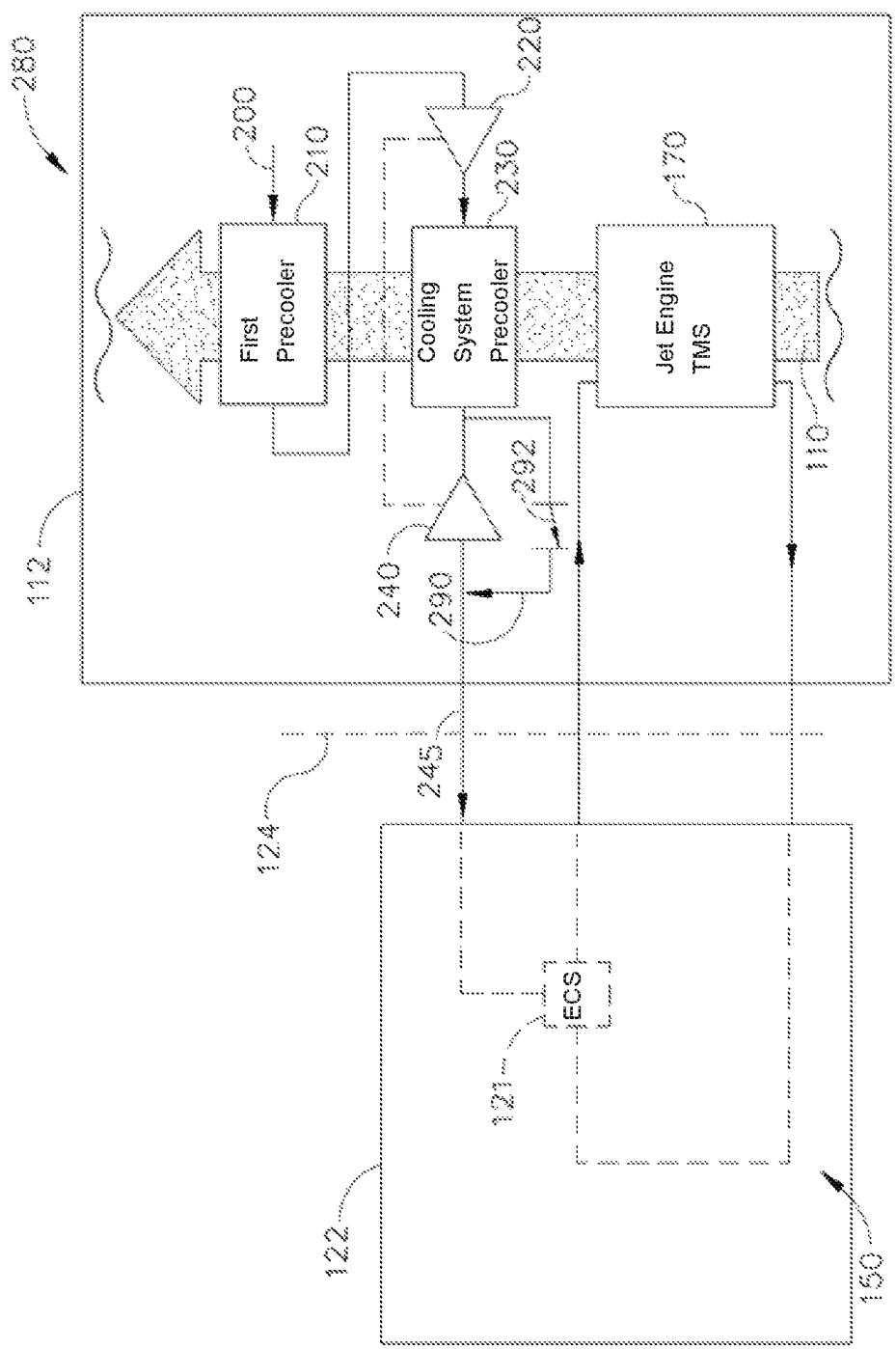
FIG. 2 is a schematic diagram of another exemplary embodiment of a cold air cooling system, shown by way of example as part of an airplane.

As shown in FIG. 2, an alternate exemplary cold air cooling system 280 includes the structures of the first exemplary cold air cooling system 100 and, for illustration purposes only, will be explained for use with the TMS loop 150 from the first exemplary embodiment. Accordingly, like reference numerals refer to similar structures as discussed pursuant to the first exemplary embodiment and will not be repeated in furtherance of brevity.

In addition to the structures of the first exemplary cold air cooling system, this first alternate exemplary cold air cooling system 280 includes a bypass line 290 and a control valve 292 in series with the bypass line. In exemplary form, the bypass line 290 is connected between the inlet and outlet of the turbine 240 to selectively allow air discharged from the cooling system precooler 230 to be directed to the ECS 121 without traveling through the turbine. By way of example, the control valve 292 is communicatively coupled to a thermocouple (not shown) in thermal communication with air discharged from the turbine 240.

Depending upon the operating conditions of the engine 112 and the ambient air properties (temperature, pressure, etc.), it may be advantageous to have bleed air bypass the turbine 240. For example, if the temperature of the air being discharged from the turbine 240 is too low, the control valve 292 may receive temperature readings from the thermocouple and, based upon program parameters, open or close valves in series with the bypass line 290 in order to increase and control the temperature of bleed air delivered to the aircraft 122 within a predetermined range. Alternatively, or in addition, the control valve 292 may be in communication with a pressure sensor at the discharge of the turbine 240. In instances where the discharge pressure is too low, the control valve 292 may receive pressure readings from the pressure sensor and, based upon program parameters, open or close valves in series with the bypass line 290 in order to increase and control the pressure of bleed air delivered to the aircraft 122 within a predetermined range. While the foregoing bypass has been described as having active management, those skilled in the art will understand that passive management is likewise feasible.

Figure 3:
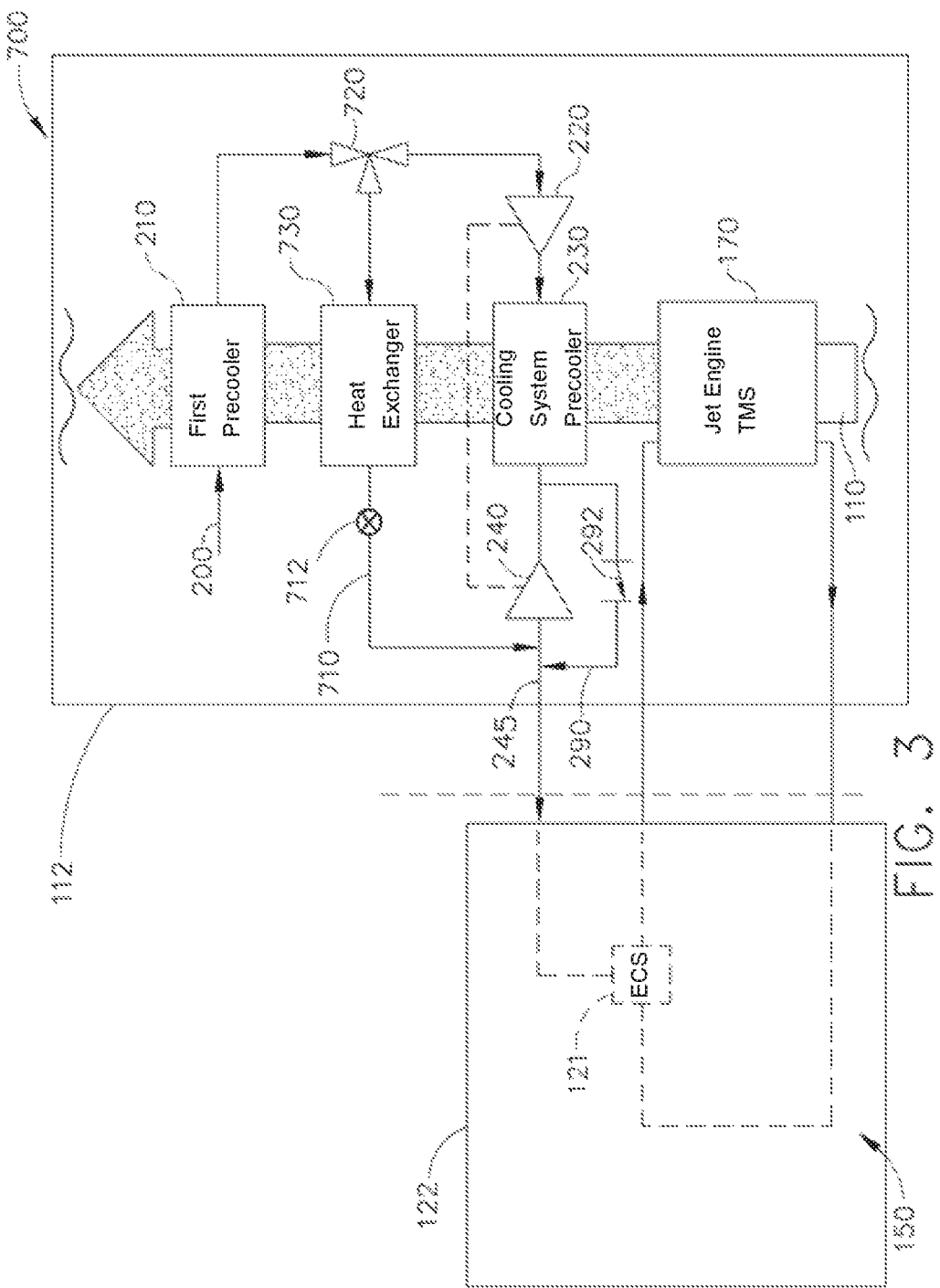
FIG. 3 is a schematic diagram of a yet another exemplary embodiment of a cold air cooling system, shown by way of example as part of an airplane.

As shown in FIG. 3, a further alternate exemplary cold air cooling system 700 includes the structures of the first alternate exemplary cold air cooling system 280. Accordingly, like reference numerals refer to similar structures as discussed pursuant to the first alternate exemplary embodiment and will not be repeated in furtherance of brevity.

In addition to the structures of the first alternate exemplary cold air cooling system 280, this further alternate exemplary cold air cooling system 700 includes a bypass line 710 and a control valve 720 downstream from and in fluid communication with the outlet side of the first precooler 210. In exemplary form, the bypass line 710 is connected between the outlet of a heat exchanger 730 and the outlet of the turbine 240 to selectively allow air discharged from the heat exchanger 730 to be directed downstream from the turbine 240. The heat exchanger 730 receives mean flow path air drawn into the engine 112 and uses this air as a heat sink to transfer thermal energy from the higher temperature air exiting the first precooler 210. By way of example, the control valve 720 may be communicatively coupled to a thermocouple (not shown) in thermal communication with air discharged from the turbine 240. Alternatively, the control valve 720 may be passively controlled and positioned downstream from the heat exchanger 730 in order to increase the temperature and/or pressure of the air delivered to the aircraft 122.

A discharge valve 712 is optionally positioned in the bypass line 710 and in fluid communication with and downstream from the heat exchanger 730, but upstream from the discharge conduit 245. The discharge valve 712 is configured to control fluid flow from the heat exchanger 730 to the discharge conduit 245. The discharge valve 712 may receive temperature readings from the thermocouple and, based upon program parameters, open or close valves in series with the bypass line 710 in order to increase and control the temperature of bleed air delivered to the aircraft 122 within a predetermined range. Alternatively, or in addition, the discharge valve 712 may be in communication with a pressure sensor at the discharge of the turbine 240. In instances where the discharge pressure is too low, the discharge valve 712 may receive pressure readings from the pressure sensor and, based upon program parameters, open or close valves in series with the bypass line 710 in order to increase and control the pressure of bleed air delivered to the aircraft 122 within a predetermined range. While the foregoing bypass has been described as having active management, those skilled in the art will understand that passive management is likewise feasible.

Depending upon the operating conditions of the engine 112 and the ambient air properties (temperature, pressure, etc.), it may be advantageous to have bleed air bypass the turbine 240. For example, if the temperature of the air being discharged from the turbine 240 is too low, the control valve 720 may receive temperature readings from the thermocouple and, based upon program parameters, open or close valves in series with the bypass line 710 in order to increase and control the temperature of bleed air delivered to the aircraft 122 within a predetermined range. Alternatively, or in addition, the control valve 720 may be in communication with a pressure sensor at the discharge of the turbine 240. In instances where the discharge pressure is too low, the control valve 720 may receive pressure readings from the pressure sensor and, based upon program parameters, open or close valves in series with the bypass line 710 in order to increase and control the pressure of bleed air delivered to the aircraft 122 within a predetermined range.

Figure 4:
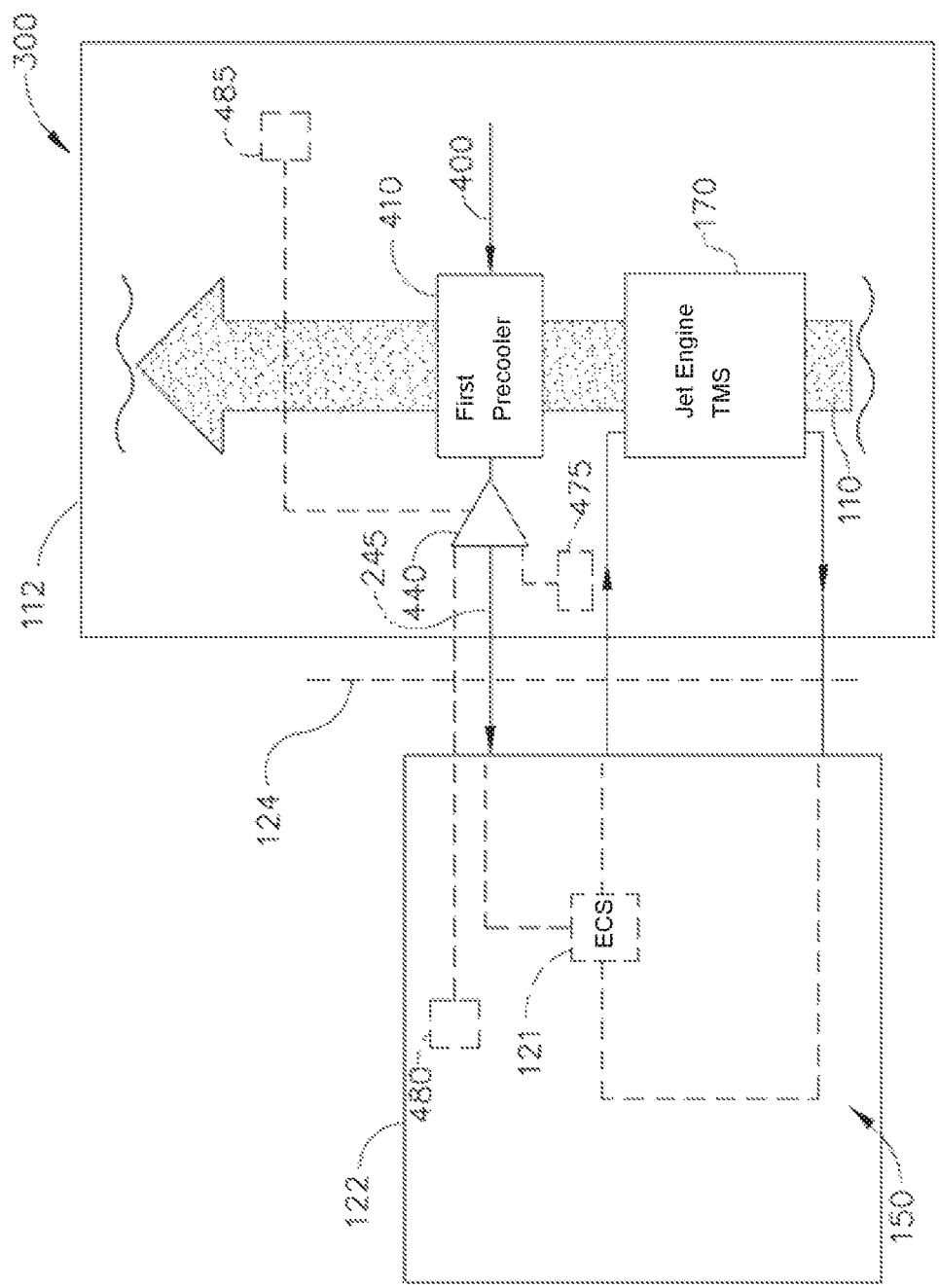
FIG. 4 is a schematic diagram of a still another exemplary embodiment of a cold air cooling system, shown by way of example as part of an airplane.

Referring to FIG. 4, a second exemplary cold air cooling system 300 is configured to supply unregulated bleed air from a high pressure compressor (HPC) section of a jet engine 112 to an aircraft 122 at a temperature that is below the temperature of the air flowing into the engine 112. For illustration purposes only, the second exemplary cold air cooling system 300 will be explained for use with the TMS loop 150 from the first exemplary embodiment. Accordingly, like reference numerals refer to similar structures as discussed pursuant to the first exemplary embodiment and will not be repeated in furtherance of brevity.

As with the first exemplary embodiment, the second exemplary cold air cooling system 300 includes a bleed air inlet feed 400 that is unregulated from the HPC section of the engine 112. This bleed air inlet feed 400 supplies high pressure and high temperature compressed air to a first precooler 410. In exemplary form, this first precooler 410 facilitates the transfer of thermal energy from the high pressure and high temperature bleed air to air that is drawn into the engine 112. The bleed air output from the precooler 410 may have a significantly reduced temperature, but its pressure will not be significantly changed. This lower temperature, high pressure air is fed into a turbine 440 having a variable area turbine nozzle. As with the foregoing embodiments, the variable area turbine nozzle may be replaced with a multiple position turbine nozzle or a fixed area turbine nozzle.

Work performed by the high pressure bleed air turning the turbine 440 may be utilized to power other equipment associated with the engine 112 or aircraft 122, with the output bleed air having a significantly reduced pressure and temperature. By way of example, the turbine 440 may be utilized to power a generator 475, mechanically rotate gears of a gearbox 480, drive a pump 485, or any combination of the foregoing mechanical device utilized for transfer of work associated with either the engine 112 or aircraft 122. Those skilled in the art will understand that the turbine 440 may be mechanically or fluidically linked to one or more of the foregoing components to capitalize upon the work performed by the high pressure bleed air rotating the turbine. In exemplary form, the temperature of the bleed air output from the turbine 440 is lower than the flow path temperature of air coming out of the precooler 410. This, again, is in stark contrast to prior art bleed air cooling systems that were unable to deliver bleed air to the aircraft 122 at a temperature below that of the ambient flow path air coming into the engine 112.

Figure 5:
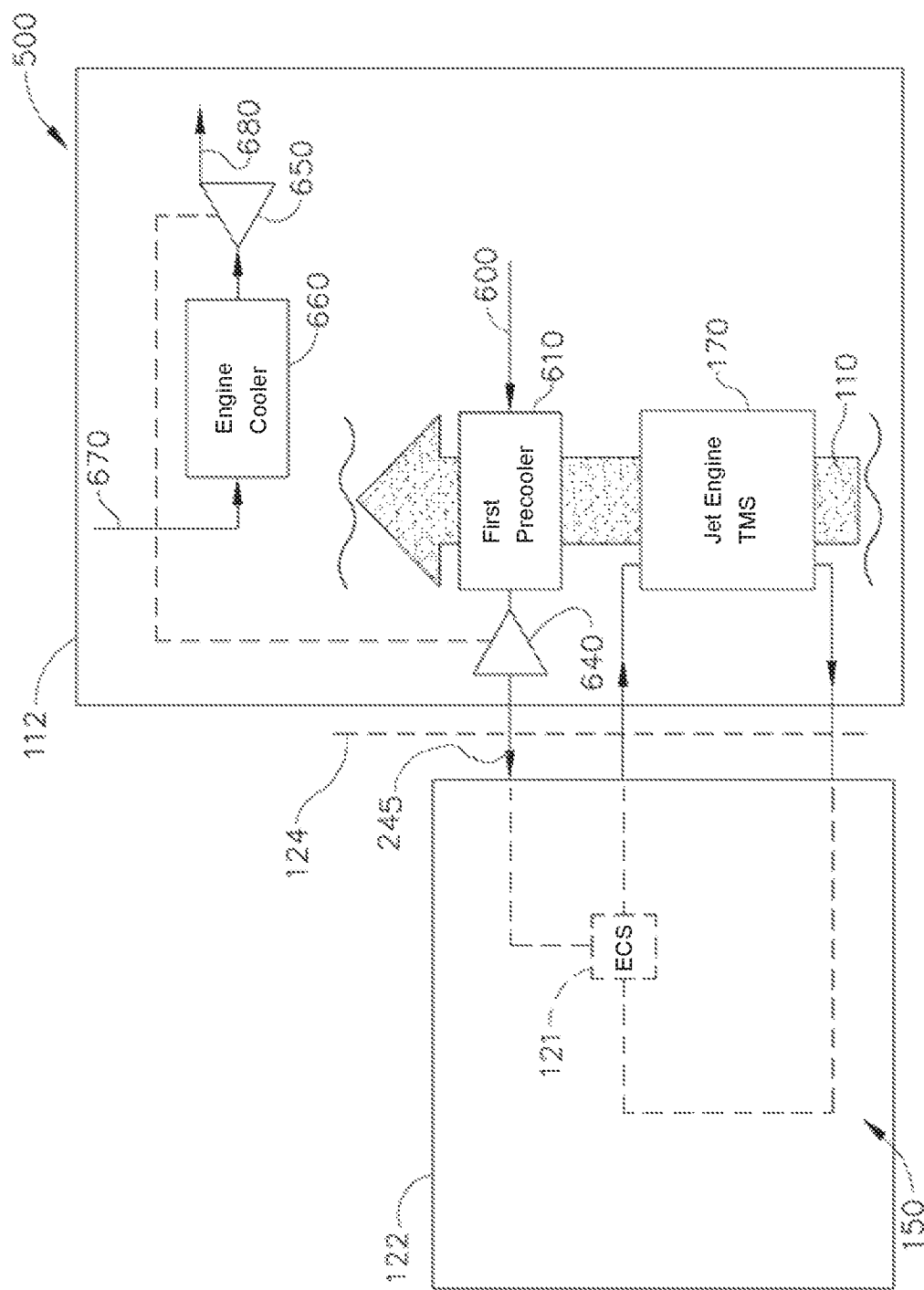
FIG. 5 is a schematic diagram of a yet another exemplary embodiment of a cold air cooling system, shown by way of example as part of an airplane.

Referencing FIG. 5, a third exemplary cold air cooling system 500 is configured to supply unregulated bleed air from a high pressure compressor (HPC) section of a jet engine 112 to an aircraft 122 at a temperature that is below the temperature of the air flowing into the engine 112. For illustration purposes only, the third exemplary cold air cooling system 500 will be explained for use with the TMS loop 150 from the first exemplary embodiment. Accordingly, like reference numerals refer to similar structures as discussed pursuant to the first exemplary embodiment and will not be repeated in furtherance of brevity.

As with the first exemplary embodiment, the third exemplary cold air cooling system 500 includes a bleed air inlet feed 600 that is unregulated from the HPC section of the engine 112. This bleed air inlet feed 600 supplies high pressure and high temperature compressed air to a first precooler 610. In exemplary form, this first precooler 610 facilitates the transfer of thermal energy from the high pressure and high temperature bleed air to air that is drawn into the engine 112. The bleed air output from the precooler 610 may have a significantly reduced temperature, but its pressure will not be significantly changed. This lower temperature, high pressure air is fed into a turbine 640 having a variable area turbine nozzle. As with the foregoing embodiments, a multiple position turbine nozzle or a fixed area turbine nozzle may be used in lieu of the variable area turbine nozzle.

Work performed by the high pressure bleed air turning the turbine 640 may be utilized to power other equipment associated with the engine 112 or aircraft 122, with the output bleed air having a significantly reduced pressure and temperature. By way of example, the turbine 640 is utilized to power a compressor 650 on the outlet side of an engine cooler 660. By way of example, the engine cooler 660 draws in flow path temperature air via an inlet 670 at a predetermined pressure. The flow path temperature air acts as a thermal sink to draw heat away from a heat source associated with the cooler 660 and exits the cooler at a pressure lower than the outlet pressure discharge 680 of the compressor 650. The pressure differential across the compressor 650 is operative to pull air into the compressor and ultimately through the inlet 670. Those skilled in the art will understand that the turbine 640 may be mechanically or fluidically linked to the compressor 650 to capitalize upon the work performed by the high pressure bleed air rotating the turbine. In exemplary form, the temperature of the bleed air output from the turbine 640 is lower than the flow path temperature of air coming out of the precooler 610. This, once again, is in stark contrast to prior art bleed air cooling systems that were unable to deliver bleed air to the aircraft 122 at a temperature below that of the air coming into the engine 112. Additionally, the bleed air output (i.e., the output fluid) can have an output temperature that is less than about half of the extracted temperature of the bleed air (e.g., less than about a third of the extracted temperature).

Figure 8:
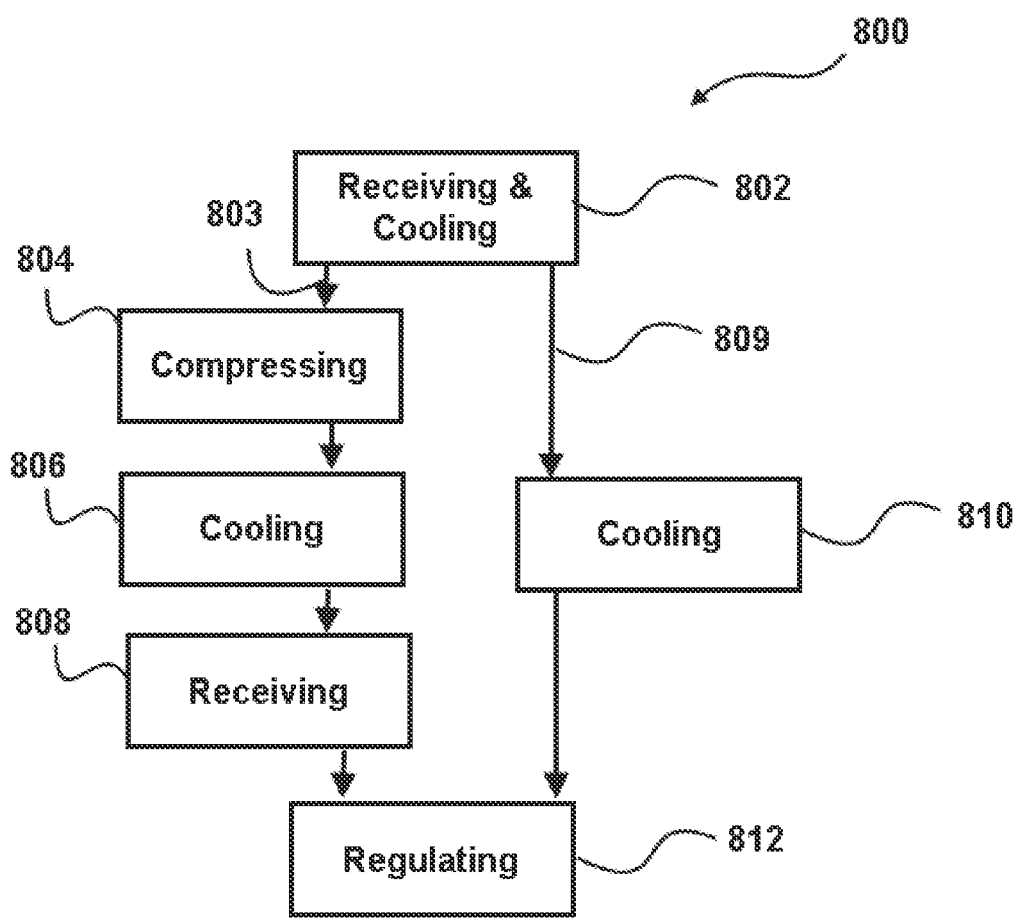
FIG. 8 shows a diagram of an exemplary method embodied by aspects of the present subject matter.

Referring to FIG. 8, an exemplary method 800 is shown for providing regulated air to an aircraft thermal management system having a thermal load. The method includes receiving and cooling at 802 from a jet engine into a first precooler. Generally, the unregulated air has an input pressure and an input temperature when received into the first precooler. Then, the first precooler can cool the unregulated air to a first temperature. A first portion 803 of the unregulated air can then be compressed at 804 to a first pressure via a compressor (e.g., a cooling system compressor). The first portion of the unregulated air can then be optionally cooled at 806 (e.g., in a cooling system precooler). The first portion of unregulated air is then received at 808 into a turbine (e.g., in a cooling system turbine) having a variable area turbine nozzle. The second portion 809 of the unregulated air is cooled at 810 via a second precooler to a second temperature. The first portion of the unregulated air and the second portion of the unregulated air are in separate flow paths, as shown. Finally, the first portion of unregulated air in the second portion of unregulated air are regulated at 812 to a discharge temperature and a discharge pressure selected to meet requirements of the aircraft thermal management system by extracting work from the turbine. In certain embodiments, the extracted work can be provided to a mechanical device utilized for transfer of work, such as a compressor, a gearbox, a generator, or a pump.

Figure 9:
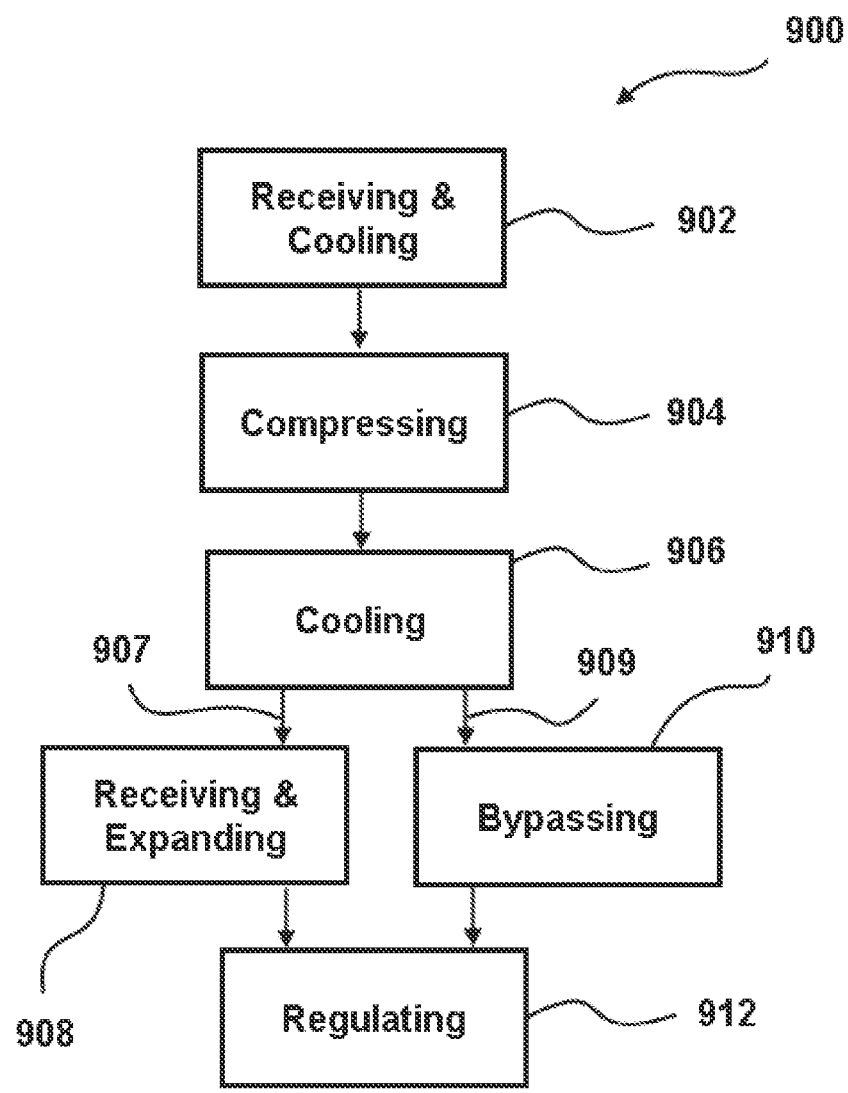
FIG. 9 shows a diagram of another exemplary method embodied by aspects of the present subject matter.

Referring to FIG. 9, an exemplary method 900 is shown for providing regulated air to an aircraft thermal management system having a thermal load. The method includes receiving and cooling at 902 from a jet engine into a first precooler. Generally, the unregulated air has an input pressure and an input temperature when received into the first precooler. Then, the first precooler can cool the unregulated air to a first temperature. The unregulated air is then compressed at 904 to a first pressure via a compressor (e.g., in a cooling system compressor). Then, the compressed unregulated air can be optionally cooled at 906 (e.g., in a cooling system precooler). A first portion 907 of the unregulated air is then received and expanded at 908 into a turbine having a variable area turbine nozzle. The second portion 909 of the unregulated air bypasses at 910 the turbine from the cooling system compressor. In a discharge conduit, the first portion of unregulated air and the second portion of unregulated air are regulated at 912 to a discharge temperature and a discharge pressure selected to meet requirements of the aircraft thermal management system by extracting work from the turbine. In certain embodiments, the extracted work can be provided to a mechanical device utilized for transfer of work, such as a compressor, a gearbox, a generator, or a pump.

In such methods, the first and second precoolers can use fan stream air from the jet engine as a heat sink fluid, with the fan stream air having a fan stream temperature and a fan stream pressure. In one embodiment, the discharge temperature is less than the fan stream temperature. For example, the jet engine can operate at sea level static conditions with a fan stream pressure that is above about 17 psi at idle and/or above about 30 psi at take-off.

The regulated air can provide a reduction of more than about 10% of the thermal load of the aircraft thermal management system, such as more than about 60%. For example, the regulated air can provide reduction of more than about 4 kW of thermal load to about 90 kW of thermal load.

It should be noted, however, that air other than flow path air may be utilized as the thermal sink for any of the precoolers 210, 230, 410, 610, 730. Moreover, while the foregoing exemplary embodiments have been described as including precoolers, it should be understood that a precooler is synonymous with a heat exchanger.

It should also be understood that while the systems 100, 280, 300, 500, 700 have been described as being associated with a jet engine 112, it is also within the scope of the disclosure to have these systems in fluid communication with other vehicles for use on water or land (e.g., boats and automobiles).

Figure 7:
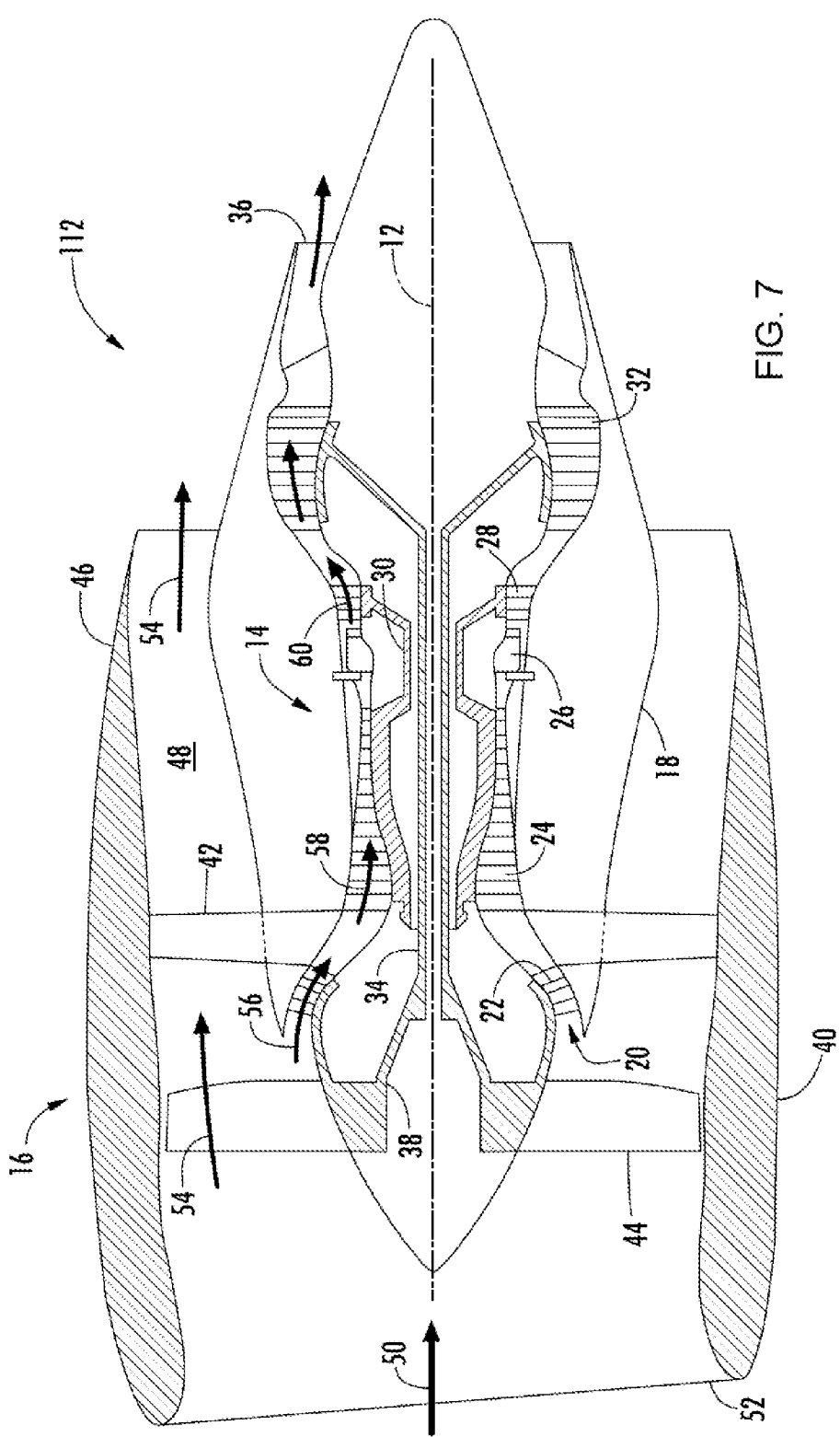
FIG. 7 illustrates a cross-sectional view of one embodiment of a gas turbine engine that may be utilized within an aircraft in accordance with aspects of the present subject matter.

FIG. 7 illustrates a cross-sectional view of one embodiment of a gas turbine engine 112 that may be utilized within an aircraft in accordance with aspects of the present subject matter, with the engine 112 being shown having a longitudinal or axial centerline axis 12 extending therethrough for reference purposes. Although shown as a turbofan jet engine, any suitable jet engine can be utilized with the cooling system described herein. For example, suitable jet engines include but are not limited to high-bypass turbofan engines, low-bypass turbofan engines, turbojet engines, turboprop engines, turboshaft engines, propfan engines, and so forth.

As shown in FIG. 7, the exemplary engine 112 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

Additionally, as shown in FIG. 7, the fan section 16 of the engine 10 may generally include a rotatable, axial-flow fan rotor 38 that configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

As used herein, flow path temperature refers to the median temperature of a fluid, namely air, while it is flowing through a predetermined section/stage of a jet engine. More specifically, flow path temperature can be no lower than the lowest temperature air drawn into the intake of a jet engine. As air is drawn into the intake and compressed, the air will increase in temperature and, accordingly, have a flow path temperature near the end of the compressor section that is above that of the flow path temperature of air at the intake.

It should also be noted that while the foregoing exemplary embodiments have been described in the context of an aircraft, the instant disclosure is equally applicable to vehicles beyond aircraft. Any vehicle having cabin or other cooling needs may be addressed using the present disclosure. For example, a boat that is jet powered may benefit from the exemplary embodiments of the instant disclosure to provide cooling to the cabin and/or the electronics associated with the boat. Consequently, the foregoing disclosure is by no means limited in application to aircraft, but rather is applicable to any vehicle utilizing jet power to provide a cooling stream wherever beneficial. Those skilled in the art will readily recognize the utility of the present disclosure in the context of other vehicles.

Following from the above description, it should be apparent to those of ordinary skill in the art that, while the methods and apparatuses herein described constitute exemplary embodiments of the present disclosure, it is to be understood that the disclosures contained herein are not limited to the above precise embodiments and that changes may be made without departing from the scope of the disclosure. Likewise, it is to be understood that it is not necessary to meet any or all of the identified advantages or objects of the disclosure in order to fall within the scope of the disclosure, since inherent and/or unforeseen advantages of the present disclosure may exist even though they may not have been explicitly discussed herein.

What is claimed is:

1. A cooling system in fluid communication with bleed air from a jet engine compressor, the cooling system comprising:
   a first precooler in fluid communication with an engine air stream and in fluid communication with the bleed air from the jet engine compressor;
   a cooling system compressor in fluid communication, via the bleed air, with and downstream from the first precooler;
   a cooling system precooler in fluid communication with the engine air stream upstream of the first precooler, and in fluid communication, via the bleed air, with and downstream from the cooling system compressor;
   a cooling system turbine in fluid communication, via the bleed air, with and downstream from the cooling system precooler;
   a discharge conduit in fluid communication, via the bleed air, with and downstream from the cooling system turbine;
   a bypass line in fluid communication, via the bleed air, with and downstream from the cooling system precooler, wherein the bypass line is in fluid communication, via the bleed air, with and upstream from the discharge conduit, and wherein the bypass line provides selective fluid communication between an inlet side and a discharge side of the cooling system turbine to bypass the cooling system turbine; and
   a heat exchanger in fluid communication with the engine air stream upstream of the first precooler and downstream of the cooling system precooler, and in fluid communication fluid, via the bleed air, with and downstream from the first precooler, the heat exchanger in fluid communication, via the bleed air, with and upstream from the cooling system compressor, and the heat exchanger and the cooling system compressor in separate bleed air flow paths from the first precooler.

2. The cooling system of claim 1, wherein the cooling system turbine has a variable area turbine nozzle.

3. The cooling system of claim 2, wherein the variable area turbine nozzle is configured to control fluid flow from the cooling system turbine to the discharge conduit.

4. The cooling system of claim 1, further comprising:
   a control valve in series with the bypass line.

5. The cooling system of claim 4, wherein the control valve is configured to control fluid flow through the bypass line to bypass the cooling system turbine.

6. The cooling system of claim 1, wherein the bleed air has an extracted temperature, and wherein the discharge conduit provides an output fluid having an output temperature that is less than about half of the extracted temperature of the bleed air.

7. The cooling system of claim 1, wherein the engine air stream to the first precooler and the cooling system precooler is fan stream air, inlet air, ram air, or a combination thereof from the jet engine used as a heat sink fluid, the heat sink fluid having an engine air stream temperature and engine air stream pressure, and wherein the discharge conduit provides an output fluid having an output temperature that is less than the engine air stream temperature.

8. The cooling system of claim 1, further comprising:
   a control valve in fluid communication with and downstream from the first precooler, wherein the control valve comprises a first outlet in fluid communication with and upstream from the heat exchanger, and wherein the control valve comprises a second outlet in fluid communication with and upstream from the cooling system turbine, and further wherein the control valve is configured to regulate control fluid flow to each of the heat exchanger and the cooling system turbine.

9. A method of cooling bleed air in a jet engine, the method comprising:
   providing a cooling system comprising a first precooler in fluid communication with an engine air stream and in fluid communication with the bleed air from a jet engine compressor,
   a cooling system compressor in fluid communication, via the bleed air, with and downstream from the first precooler,
   a cooling system precooler in fluid communication with the engine air stream upstream of the first precooler and in fluid communication, via the bleed air, with and downstream from the cooling system compressor,
   a cooling system turbine in fluid communication, via the bleed air, with and downstream from the cooling system precooler,
   a discharge conduit in fluid communication, via the bleed air, with and downstream from the cooling system turbine,
   a bypass line in fluid communication, via the bleed air, with and downstream from the cooling system precooler, wherein the bypass line is in fluid communication in fluid communication, via the bleed air, with and upstream from the discharge conduit, and wherein the bypass line provides selective fluid communication between an inlet side and a discharge side of the cooling system turbine to bypass the cooling system turbine, and
   a heat exchanger in fluid communication with the engine air stream upstream of the first precooler and downstream of the cooling system precooler, and in fluid communication, via the bleed air, with and downstream from the first precooler, the heat exchanger in fluid communication, via the bleed air, with and upstream from the cooling system compressor, and the heat exchanger and the cooling system compressor in separate flow paths from the first precooler;
   extracting the bleed air from the jet engine compressor;
   directing the bleed air to the first precooler, wherein the bleed air has an extracted temperature; reducing the extracted temperature of the bleed air to a second temperature in the first precooler;
   thereafter, directing a first portion of the bleed air to the cooling system compressor;
   flowing the first portion of the bleed air sequentially through the cooling system compressor and the cooling system precooler;
   flowing the first portion of the bleed air from the cooling system precooler into the cooling system turbine to reduce the second temperature of the first portion of the bleed air to a third temperature, wherein the third temperature is less than the second temperature;

flowing a second portion of the bleed air from the cooling system precooler through the bypass line; and thereafter, mixing the first portion and the second portion in the discharge conduit.

10. The method as in claim 9, further comprising:
controlling the flow of the first portion through the cooling system turbine.

11. The method as in claim 10, wherein the cooling system turbine has a variable area turbine nozzle to control the flow through the cooling system turbine.

12. The method as in claim 9, further comprising:
controlling the flow of the first portion through the cooling system turbine.

13. The method as in claim 12, wherein a control valve is in series with the bypass line.

14. The method as in claim 13, wherein the control valve is configured to control a flow of the second portion through the bypass line to bypass the cooling system turbine.

15. The method as in claim 9, wherein the bleed air has an extracted temperature, and wherein the discharge conduit provides an output fluid having an output temperature that is less than about half of the extracted temperature of the bleed air.

16. The method as in claim 9, wherein the engine air stream to the first precooler and the cooling system precooler is fan stream air, inlet air, ram air, or a combination thereof from the jet engine used as a heat sink fluid, the heat sink fluid having an engine air stream temperature and engine air stream pressure, and wherein the discharge conduit provides an output fluid having an output temperature that is less than the engine air stream temperature.

17. A method of providing regulated air to an aircraft thermal management system having a thermal load; the method comprising:
providing a cooling system comprising a first precooler in fluid communication with an engine air stream and in fluid communication with a bleed air from a jet engine compressor,
a cooling system compressor in fluid communication, via the bleed air, with and downstream from the first precooler,
a cooling system precooler in fluid communication with the engine air stream upstream of the first precooler, and
in fluid communication, via the bleed air, with and downstream from the cooling system compressor,
a cooling system turbine in fluid communication, via the bleed air, with and downstream from the cooling system precooler, a discharge conduit downstream from the cooling system turbine,
a bypass line in fluid communication, via the bleed air, with and downstream from the cooling system precooler, wherein the bypass line is in fluid communication, via the bleed air, with and upstream from the discharge conduit, and wherein the bypass line provides selective fluid communication between an inlet side and a discharge side of the cooling system turbine to bypass the cooling system turbine, and
a heat exchanger in fluid communication with the engine air stream upstream of the first precooler and downstream of the cooling system precooler, and in fluid communication, via the bleed air, with and downstream from the first precooler, the heat exchanger in fluid communication, via the bleed air, with and upstream from the cooling system compressor, and the heat exchanger and the cooling system compressor in separate flow paths from the first precooler;
receiving unregulated air from a jet engine into the first precooler, the unregulated air having an input pressure and an input temperature; cooling the unregulated air in the first precooler to a first temperature;
compressing the unregulated air via the cooling system compressor to a first pressure; cooling the unregulated air via the cooling system precooler to a second pressure;
receiving a first portion of the unregulated air downstream from the cooling system compressor into the cooling system turbine having a variable area turbine nozzle; expanding the first portion of the unregulated air in the cooling system turbine and into the discharge conduit;
bypassing a second portion of the unregulated air downstream from the cooling system compressor into the discharge conduit; and expanding the first portion of unregulated air to a discharge temperature and a discharge pressure selected to meet requirements of the aircraft thermal management system by extracting work from the cooling system turbine.

18. The method of claim 17, wherein the engine air stream to the first precooler and the cooling system precooler is fan stream air, inlet air, ram air, or a combination thereof from the jet engine used as a heat sink fluid, the heat sink fluid having an engine air stream temperature and engine air stream pressure.

19. The method of claim 18, wherein the discharge temperature is less than the engine air stream temperature.

20. The method of claim 17, wherein the extracted work is provided to a mechanical device utilized for transfer of work, the device selected from the group consisting of a compressor, a gearbox, a generator, and a pump.

21. The method of claim 17, wherein the regulated air provides a thermal load reduction of 4 kW to 90 kW.

* * * * *